United States Patent
Takahashi et al.

(10) Patent No.: US 10,539,081 B2
(45) Date of Patent: Jan. 21, 2020

(54) INTERNAL-COMBUSTION ENGINE CONTROL APPARATUS FOR CONTROLLING WASTE GATE VALVE OPENING DEGREE

(71) Applicant: Mitsubishi Electric Corporation, Tokyo (JP)

(72) Inventors: Tatsuhiko Takahashi, Hyogo (JP); Takahiko Ono, Hyogo (JP)

(73) Assignee: Mitsubishi Electric Corporation, Tokyo (JP)

( * ) Notice: Subject to any disclaimer, the term of this patent is extended or adjusted under 35 U.S.C. 154(b) by 86 days.

(21) Appl. No.: 15/726,547

(22) Filed: Oct. 6, 2017

(65) Prior Publication Data

US 2018/0306130 A1     Oct. 25, 2018

(51) Int. Cl.
    *F02D 41/00*       (2006.01)
    *F02D 41/14*       (2006.01)
    *F02B 37/16*       (2006.01)

(52) U.S. Cl.
CPC ........ *F02D 41/0007* (2013.01); *F02B 37/162* (2019.05); *F02D 41/1439* (2013.01); *F02D 41/1447* (2013.01)

(58) Field of Classification Search
CPC .................................................. F02D 41/1447
See application file for complete search history.

(56) References Cited

U.S. PATENT DOCUMENTS

| | | | |
|---|---|---|---|
| 9,879,598 B2* | 1/2018 | Hanawa | F02B 29/04 |
| 2011/0231081 A1* | 9/2011 | Suzuki | F01N 11/005 |
| | | | 701/104 |
| 2011/0270504 A1* | 11/2011 | Barasa | F01N 9/002 |
| | | | 701/101 |
| 2016/0160777 A1* | 6/2016 | Hanawa | F02D 41/1446 |
| | | | 374/144 |
| 2016/0169168 A1* | 6/2016 | Hanawa | F02D 41/144 |
| | | | 123/568.12 |
| 2017/0051662 A1 | 2/2017 | Hagari et al. | |
| 2017/0051663 A1* | 2/2017 | Inoue | F02B 37/183 |
| 2017/0089282 A1* | 3/2017 | Nishio | F02D 41/0235 |

FOREIGN PATENT DOCUMENTS

| JP | 2015-031170 A | 2/2015 |
|---|---|---|
| JP | 5963927 B1 | 8/2016 |

* cited by examiner

*Primary Examiner* — Laert Dounis
(74) *Attorney, Agent, or Firm* — Sughrue Mion, PLLC; Richard C. Turner

(57) ABSTRACT

An internal-combustion engine control apparatus is obtained which can accurately perform the control toward an output target value by calculating an exhaust gas temperature more accurately, and eliminating discrepancies of a turbine flow-rate and a waste-gate-valve opening-degree. In the apparatus, a thermal efficiency calculation unit calculates thermal efficiency based on a combination in any of ignition timing, charging efficiency, an air-fuel ratio and an exhaust gas recirculation (EGR) ratio being change factors in thermal efficiency of the internal-combustion engine; an exhaust-gas loss calculation unit calculates exhaust gas loss based on thermal efficiency calculated by the thermal efficiency calculation unit, and on a combination in any of the change factors of the exhaust gas loss; and an exhaust port temperature calculation unit calculates an exhaust gas temperature at an exhaust port portion based on exhaust gas loss calculated by the exhaust-gas loss calculation unit.

10 Claims, 7 Drawing Sheets

INTERNAL-COMBUSTION ENGINE CONTROL APPARATUS FOR CONTROLLING WASTE GATE VALVE OPENING DEGREE

BACKGROUND OF THE INVENTION

Field of the Invention

The present invention relates to an internal-combustion engine control apparatus capable of performing state estimation of an exhaust gas system in which a temperature of exhaust gas exhausted from the internal-combustion engine is estimated.

Description of the Related Art

Conventionally, in order to achieve an object to enhance an output of an internal-combustion engine or to do the like, a supercharger or turbocharger mounted engine is known which mounts the turbocharger therein that operates by rotating its turbine using exhaust gas.

In Patent Document 1, an apparatus is disclosed in which a waste-gate-valve opening-degree is controlled by calculating the amount of target intake air (approximately equal to target charging efficiency) based on an output target value of an engine, by calculating target turbocharging pressure based on the amount of target intake air and an engine's rotational speed, by calculating a target turbine flow-rate from the target turbocharging pressure, and by calculating a target waste-gate-valve flow-rate from an exhaust gas flow-rate and the target turbine flow-rate, so that compressor driving-force is controlled so as to achieve target torque.

An exhaust gas temperature is required for calculating the target waste-gate-valve flow-rate; however, in Patent Document 1, a mapped value is used for the exhaust gas temperature which is referred to based on charging efficiency stored in a memory and a rotational speed stored therein.

In Patent Document 2, the quantity of change in thermal efficiency from that in a reference operating state is calculated from quantities of change in intake-air oxygen concentration and fuel injection timing, and an exhaust gas temperature is estimated based on the amount of exhaust-gas heat in the reference operating state and the quantity of change in thermal efficiency from that in the reference operating state.

[Patent Document 1] Japanese Patent Publication No. 5963927

[Patent Document 2] Japanese Laid-Open Patent Publication No. 2015-031170

Because, in Patent Document 1, a change in the exhaust gas temperature cannot be dealt, in a case in which shift and/or variation occur in ignition timing and an air-fuel ratio, with an exhaust gas temperature acquired from a map referred to charging efficiency and a rotational speed, there arises a problem in that turbocharging pressure becomes excessive to cause damage to an engine and/or a turbocharger because a turbine flow-rate and a waste-gate-valve opening-degree calculated by using the exhaust gas temperature are shifted; there also arise problems in that running performance is degraded owing to lack of turbocharging pressure, and that fuel consumption or the like is degraded because of lack of turbocharging pressure intended to compensate it by excessive accelerator operations.

In addition, in Patent Document 2, an exhaust gas temperature is estimated based on the quantity of change of thermal efficiency from that in a reference operating state, and thus there arises a problem in that, when the relationship between thermal efficiency and the amount of exhaust-gas heat is shifted due to a variation in cooling losses or the like, the exhaust gas temperature is departed.

SUMMARY OF THE INVENTION

The present invention has been directed at solving these problems described above, and an object of the invention is to obtain an internal-combustion engine control apparatus which can calculate an exhaust gas temperature accurately by estimating exhaust gas loss more accurately, eliminate the discrepancy of a turbine flow-rate and/or that of a waste-gate-valve opening-degree, and control toward an output target value more accurately.

An internal-combustion engine control apparatus according to the present invention is an apparatus which comprises: a thermal efficiency calculation unit for calculating thermal efficiency based on a combination in any of ignition timing, charging efficiency, an air-fuel ratio and an exhaust gas recirculation ratio being change factors in thermal efficiency of an internal-combustion engine; an exhaust-gas loss calculation unit for calculating exhaust gas loss based on thermal efficiency calculated by the thermal efficiency calculation unit, and on a combination in any of ignition timing, charging efficiency, an air-fuel ratio and an exhaust gas recirculation ratio being change factors of the exhaust gas loss; and an exhaust port temperature calculation unit for calculating an exhaust gas temperature at an exhaust port portion based on exhaust gas loss calculated by the exhaust-gas loss calculation unit.

According to the internal-combustion engine control apparatus of the present invention, a change in exhaust gas loss due to a change in thermal efficiency can be accurately estimated by acquiring exhaust gas loss in accordance with thermal efficiency and with a combination in any two or more of ignition timing, charging efficiency, an air-fuel ratio and an exhaust gas recirculation (EGR) ratio being factors to influence the change in exhaust gas loss and then by estimating an exhaust gas temperature at an exhaust port portion, so that the exhaust gas temperature at the exhaust port portion can be accurately estimated, and it is possible to prevent damage to an internal combustion engine and/or a turbocharger, and degradation of running performance and that of fuel consumption.

BRIEF DESCRIPTION OF DRAWINGS

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
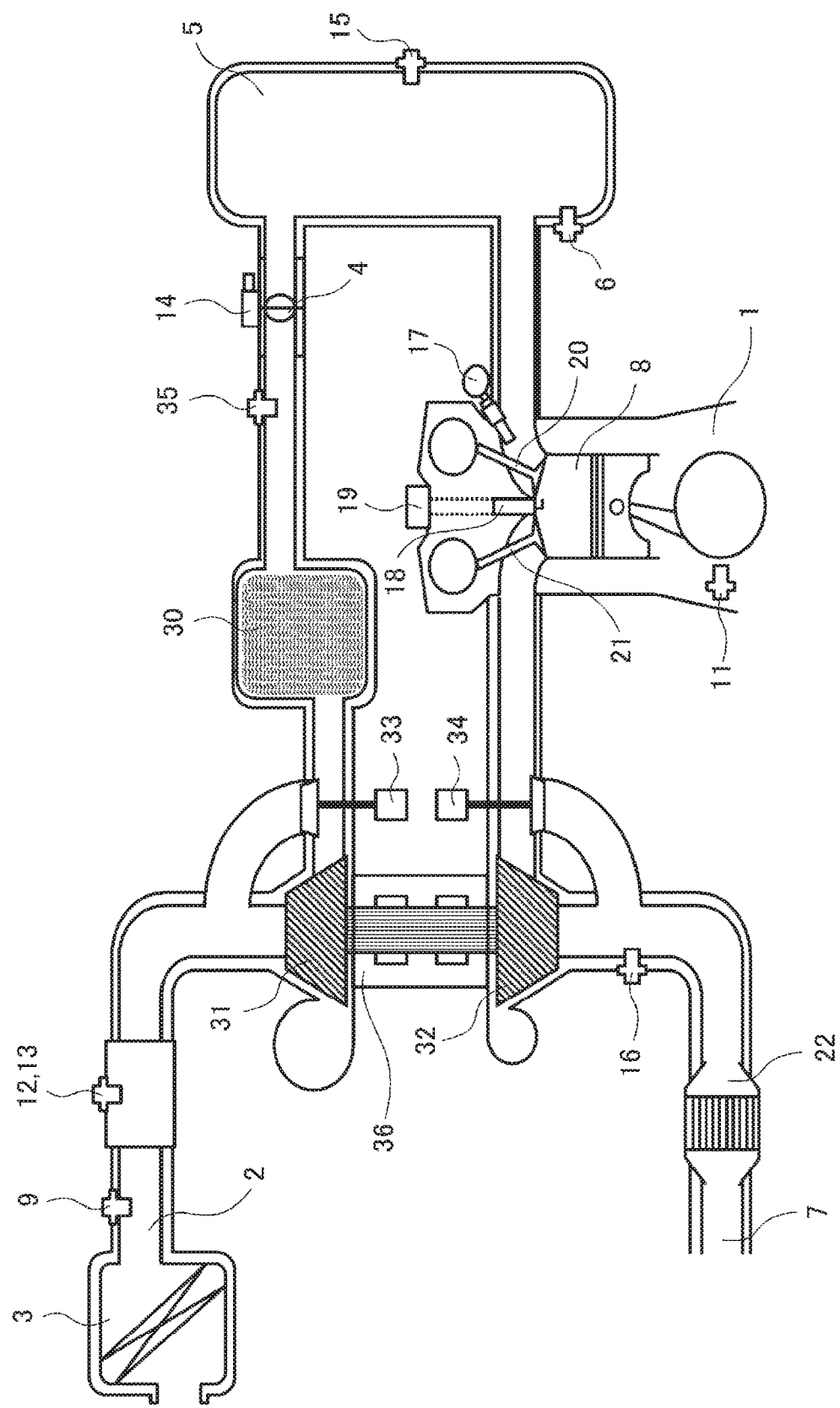
FIG. 1 is a diagram illustrating a system configuration of an internal combustion engine to which an internal-combustion engine control apparatus according to Embodiment 1 and Embodiment 2 of the present invention is applied.

Hereinafter, the embodiments of the present invention will be described in detail referring to the drawings. Note that, in each of the figures, the same reference numerals and symbols designate the same items as, or the items corresponding to, those shown in the drawings.

Embodiment 1

FIG. 1 is a diagram illustrating a configuration of an air intake and exhaust system of an internal combustion engine (hereinafter, referred to as an "engine") according to the present invention. In FIG. 1, as for a crankshaft of an engine 1, a crankshaft angle sensor 11 is placed therein for generating an electric signal responding to a rotation angle of the crankshaft. In addition, to an intake port toward a combustion chamber of the engine 1 and to an exhaust port therefrom, an intake pipe 2 which forms an intake-air path and an exhaust pipe 7 which forms an exhaust-gas path are connected, respectively.

On an upstream side of the intake pipe 2 (on an opposite side to the engine 1), an air cleaner 3 is placed for cleaning up an external atmospheric air being taken in. Downstream of the air cleaner 3 of the intake pipe 2 (on a side toward the engine 1), mounted integrally with each other or separately from each other are an air flow sensor 12 for generating an electric signal responding to the amount of an intake air flow and an intake air temperature sensor (intake-air temperature sensor) 13 for generating an electric signal responding to an intake air temperature in the intake-air path. Note that, in FIG. 1, an example is shown in which both of the sensors 12 and 13 are integrally made with each other. In addition, downstream of the air cleaner 3 of the intake pipe 2 (on a side toward the engine 1), an atmospheric air pressure sensor 9 for generating an electric signal responding to atmospheric air pressure is mounted.

On an upstream side of the exhaust pipe 7 (on a side toward the engine 1), a exhaust-gas clean catalyst 22 is provided. Upstream of the exhaust-gas clean catalyst 22 of the exhaust pipe 7 (on a side toward the engine 1), an air-fuel ratio sensor 16 for generating an electric signal responding to a ratio between air and a fuel being combusted is mounted.

In addition, in an air intake and exhaust circuit made of the intake pipe 2 and the exhaust pipe 7, a turbocharger (turbo charger) 36 is mounted which includes a compressor (compression machine) 31 and a turbine 32 that integrally rotates with the compressor 31. The turbine 32 is mounted on a more upstream side of the exhaust-gas clean catalyst 22 of the exhaust pipe 7, and is so arranged that the turbine is rotationally driven by means of exhaust gas which flows through within the exhaust pipe 7. The compressor 31 is mounted downstream of the air cleaner 3 of the intake pipe 2. The compressor 31 is so arranged that air within an intake-air path is compressed in association with the revolution of the turbine 32 which is rotationally driven.

On a downstream side of the compressor 31, an air bypass valve 33 for diverting the amount of compressed air through the intake pipe 2 is mounted in order not to cause damage to the turbine 32 mainly at the time of accelerator's "OFF" owing to backflow of turbocharging pressure under compression. Downstream of the air bypass valve 33, an intercooler 30 is mounted. Downstream of the intercooler 30, a throttle valve 4 for adjusting the amount of air to be conveyed to the engine 1 is mounted. To the throttle valve 4, a throttle position sensor 14 is connected for generating an electric signal responding to the degree of throttle opening of the throttle valve. In addition, upstream of the throttle valve 4, a throttle upstream pressure sensor 35 for generating an electric signal responding to air pressure between the intercooler 30 and the throttle valve 4 is mounted.

Moreover, downstream of the throttle valve 4 in an intake-air path of the intake pipe 2, a surge tank 5 for cancelling out an intake-air pulsation is mounted. On the surge tank 5, an inlet manifold pressure sensor (hereinafter, inlet-manifold pressure sensor) 15 for generating an electric signal responding to air pressure in the surge tank 5, and an inlet-manifold intake-air temperature sensor 6 for generating an electric signal responding to an intake-air temperature in the surge tank 5 are mounted. In place of the inlet-manifold pressure sensor 15 for directly measuring inlet manifold pressure (hereinafter, inlet-manifold pressure) Pb, it may be adopted that the inlet-manifold pressure Pb is estimated from other sensor information. In place of the inlet-manifold intake-air temperature sensor 6 for directly measuring an intake-air temperature at an intake port portion, it may be adopted that an intake-air temperature $T_{in}$ at the intake port portion is estimated from other sensor information.

In the intake pipe 2, downstream of the surge tank 5 on a side toward the engine 1, an injector 17 for injecting a fuel is mounted. Note that, the injector 17 may be mounted so that the injector directly injects a fuel into a cylinder 8.

At a top portion of the cylinder 8, mounted are a spark plug 18 for igniting a combustible mixture produced by mixing air taken in the engine 1 together with a fuel injected from the injector 17, and an ignition coil 19 for generating an electric current to ignite the spark plug 18 with a spark. Also mounted are an intake valve 20 for adjusting the amount of combustible mixture introduced into the cylinder 8 through an intake-air path, and an exhaust valve 21 for adjusting the amount of exhaust gas exhausted from inside of the cylinder 8 into an exhaust-gas path of the engine 1.

On an upstream side of the turbine 32, a waste gate valve 34 for diverting exhaust gas through an exhaust-gas bypass channel is mounted in order not to cause damage to the engine 1 even when turbocharging pressure under compression increases owing to turbine's high revolution and heavy loading.

As for an actuator to drive the waste gate valve 34, either one of a pressure type for controlling the pressure caused on a diaphragm and a motor-operated type for directly actuating a valve opening-degree can be used.

Although not shown in FIG. 1, a variable valve timing mechanism of the intake valve (intake VVT), a variable valve timing mechanism of the exhaust valve (exhaust VVT) and an exhaust gas recirculation (EGR) valve are included as mechanisms for lowering exhaust gas emissions and enhancing fuel consumption.

Figure 2:
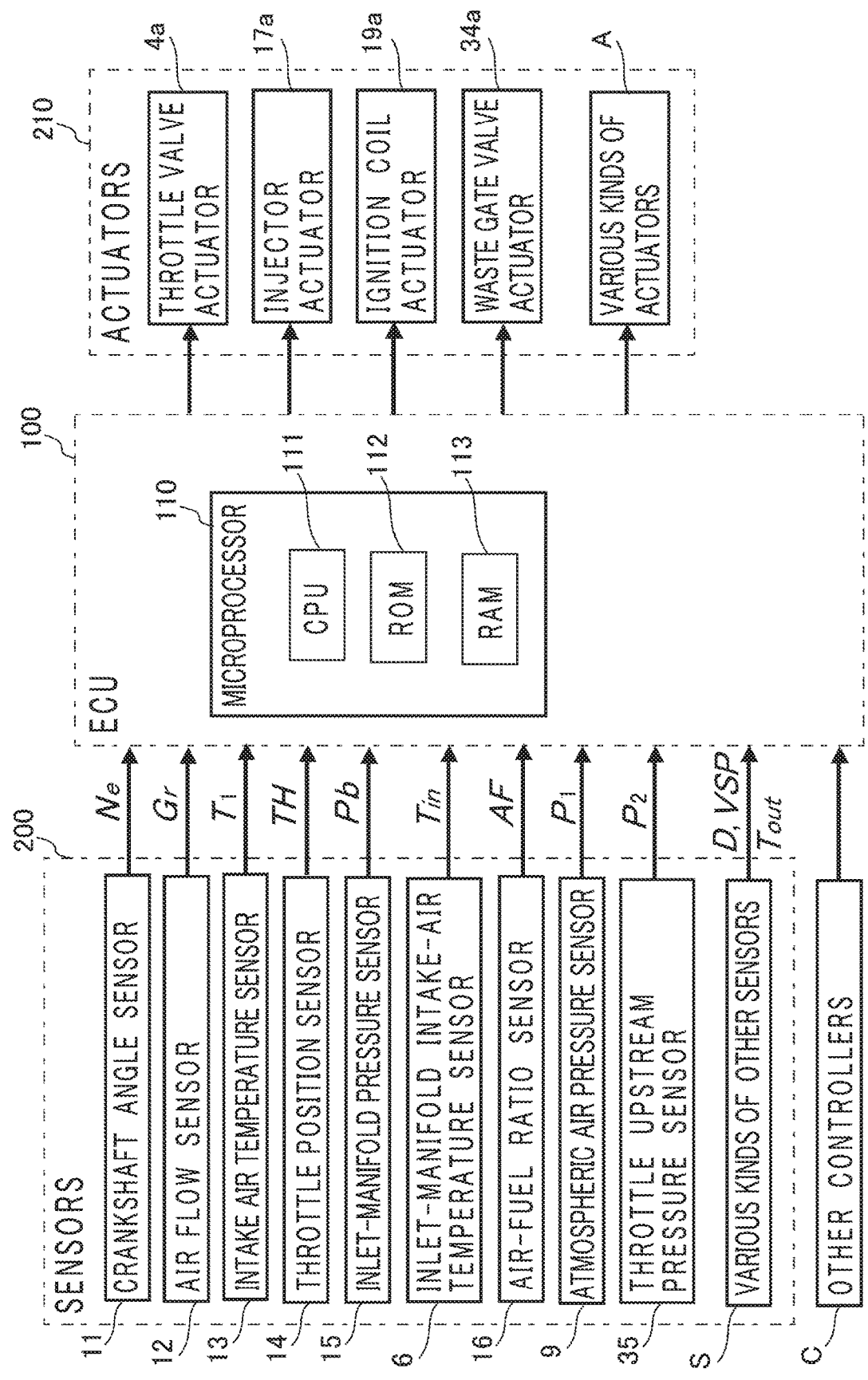
FIG. 2 is a block diagram illustrating the internal-combustion engine control apparatus according to Embodiment 1 and Embodiment 2 of the present invention.

FIG. 2 is a block diagram schematically illustrating a configuration of the internal-combustion engine control apparatus according to the present invention; In FIG. 2, an electronic control unit (hereinafter, referred to as an "ECU") 100 receives an electric signal generated by each of the crankshaft angle sensor 11, the air flow sensor 12, the intake air temperature sensor 13, the throttle position sensor 14, the inlet-manifold pressure sensor 15, the inlet-manifold intake-air temperature sensor 6 and the air-fuel ratio sensor 16 which are constituting sensors 200.

Respective a crankshaft angle sensor's rotational speed (also referred to as an "engine's rotational speed") Ne, an actually measured air flow-rate $G_r$, an intake air temperature $T_1$, the degree of throttle-valve opening TH, inlet-manifold pressure Pb or intake atmospheric air pressure, an intake-air temperature $T_{in}$ at an intake port portion and an air-fuel ratio AF are shown in the figure.

In addition, the ECU 100 also receives an electric signal from each of the atmospheric air pressure sensor 9 required for a turbocharger, the throttle upstream pressure sensor 35 and various kinds of other sensors S. Among these various kinds of sensors, included are an accelerator position sensor or an accelerator opening-degree sensor for generating an electric signal responding to an operation quantity of an accelerator (not shown in the figure), a sensor for controlling the combustion of the engine 1, and sensors for controlling behavior of an automotive vehicle (for example, a vehicle speed sensor, an external atmospheric air temperature sensor and the like).

Respective atmospheric air pressure $P_1$, throttle upstream pressure $P_2$, an accelerator opening-degree D, a vehicle speed VSP, an external atmospheric air temperature $T_{out}$ and the like are shown in the figure.

Moreover, the ECU 100 calculates estimate output torque TRQ (not shown in the figure) which estimates actual torque produced from the engine 1 based on each of input data such as a rotational speed Ne from the crankshaft angle sensor 11, an actually measured air flow-rate $G_r$ from the air flow sensor 12, the degree of throttle-valve opening TH from the throttle position sensor 14, inlet-manifold pressure Pb from the inlet-manifold pressure sensor 15, an air-fuel ratio AF from the air-fuel ratio sensor 16, atmospheric air pressure $P_1$ from the atmospheric air pressure sensor 9, throttle upstream pressure $P_2$ from the throttle upstream pressure sensor 35, and an accelerator opening-degree D from an accelerator opening-degree sensor (among the various kinds of sensors S) for detecting an opening-degree of an accelerator mounted on an automotive vehicle; and the ECU also calculates target torque TRQt (not shown in the figure) based on input data from each of the sensors described above and on torque request values from other controllers C (for example, controllers for transmission control, brake control, traction control, stability control and so forth).

Furthermore, the ECU 100 controls actuators 210 in such manners that, by referring to an air-fuel ratio AF and each of control target values (for example, the degrees of intake and exhaust variable valve timing (VVT) openings, an exhaust gas recirculation (EGR) ratio, ignition timing and so forth) to achieve the target torque TRQt, an actuator (drive unit) 4a of the throttle valve 4 is drive-controlled so as to achieve a target intake air flow-rate $G_{at}$ in the amount of an intake air flow, that an actuator (drive unit) 17a of the injector 17 is drive-controlled so as to achieve a target value of air-fuel ratio AF, that an actuator unit (drive unit) 19a made of a drive circuit of the ignition coil 19 is controlled in its electrical conduction so as to achieve a target value at ignition timing, and that an actuator (drive unit) 34a of the waste gate valve 34 is drive-controlled so as to achieve a target value of a waste-gate-valve opening-degree. In addition, the ECU 100 also calculates target values with respect to various kinds of actuators A other than those actuators described above, and performs the control thereto. In addition, on the various kinds of actuators A, the control is performed, for example, to drive or halt a radiator fan.

Here, the ECU 100 is made of a microprocessor 110 having a CPU 111 for executing calculation processing, a ROM 112 for storing program data and fixed value data, and a RAM 113 whose stored data can be sequentially rewritten by updating the data. Including the ROM and the RAM, they are collectively referred to as a memory unit.

Figure 3:
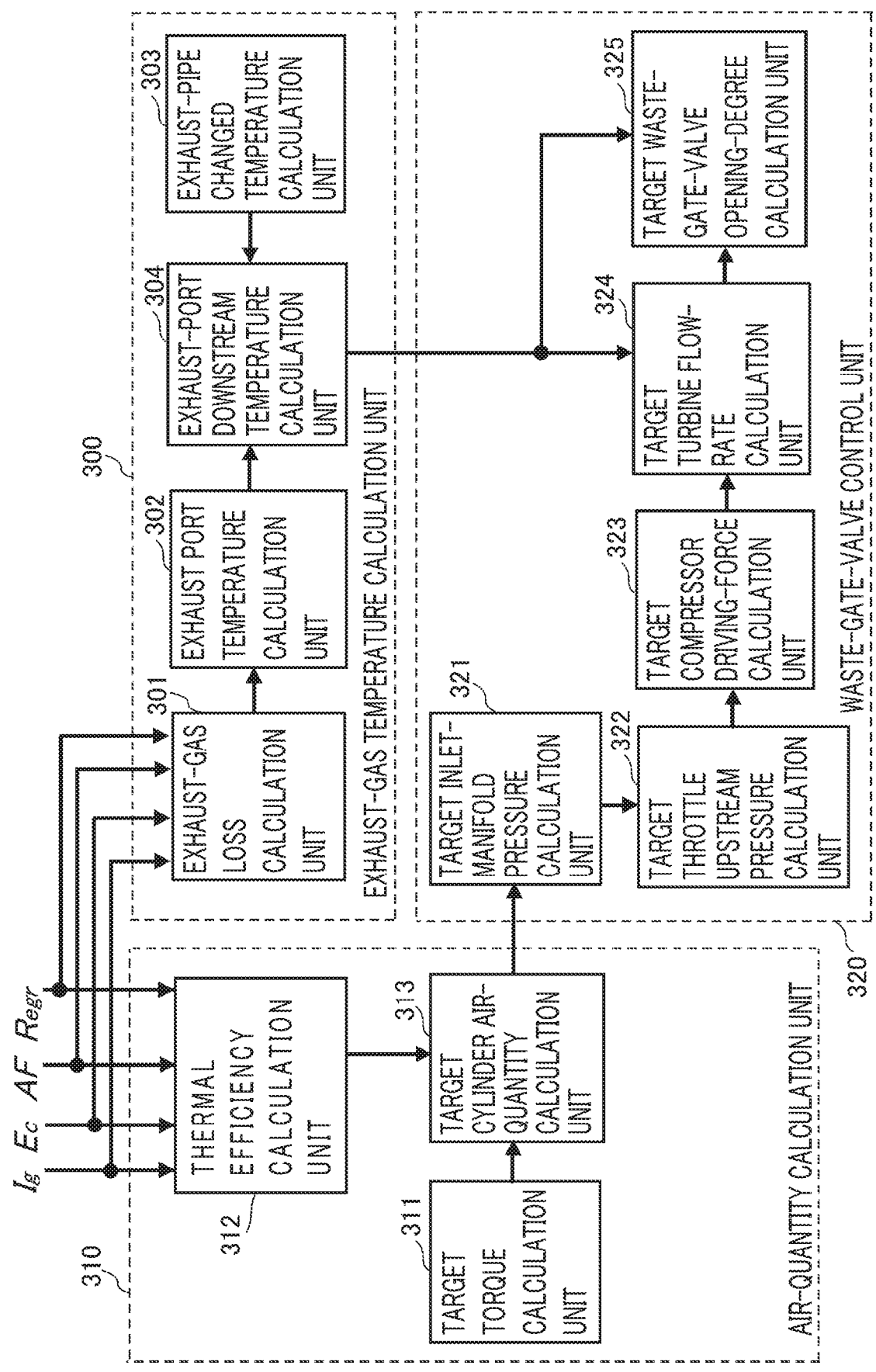
FIG. 3 is a block diagram illustrating the functions of the internal-combustion engine control apparatus according to Embodiment 1 and Embodiment 2 of the present invention.

FIG. 3 is a block diagram specifically illustrating functions related to exhaust-gas temperature calculation, air-quantity calculation and waste-gate-valve control among the functions in which the ECU 100 of FIG. 2 possesses. In the ROM 112 of the ECU 100, an exhaust-gas temperature calculation unit 300, an air-quantity calculation unit 310 and a waste-gate-valve control unit 320 are stored as software.

The exhaust-gas temperature calculation unit 300 includes an exhaust-gas loss calculation unit 301, an exhaust port temperature calculation unit 302, an exhaust-pipe changed temperature calculation unit 303 and an exhaust-port downstream temperature calculation unit 304.

The air-quantity calculation unit 310 includes a target torque calculation unit 311, a thermal efficiency calculation unit 312 and a target cylinder air-quantity calculation unit 313.

The waste-gate-valve control unit 320 includes a target inlet-manifold pressure calculation unit 321, a target throttle upstream pressure calculation unit 322, a target compressor driving-force calculation unit 323, a target turbine flow-rate calculation unit 324 and a target waste-gate-valve opening-degree calculation unit 325.

In the exhaust-gas loss calculation unit 301, exhaust gas loss is calculated from thermal efficiency calculated by the thermal efficiency calculation unit 312, ignition timing $I_g$, charging efficiency Ec, an air-fuel ratio AF, an EGR ratio $R_{egr}$ and so forth.

In the exhaust port temperature calculation unit 302, an exhaust gas temperature at an exhaust port portion is calculated using exhaust gas loss calculated by the exhaust-gas loss calculation unit 301.

In the exhaust-pipe changed temperature calculation unit 303, calculated is a changed temperature which is a change of temperatures, from the exhaust port portion toward a turbine upstream portion being an exhaust-port downstream portion, due to thermal losses therebetween.

In the exhaust-port downstream temperature calculation unit 304, an exhaust gas temperature in the turbine upstream portion being an exhaust-port downstream portion is calculated from the exhaust gas temperature at the exhaust port portion calculated by the exhaust port temperature calculation unit 302 and from the changed temperature calculated by the exhaust-pipe changed temperature calculation unit 303.

In the target torque calculation unit 311, target torque is calculated based on request torque from other controllers according to an accelerator opening-degree, a transmission and the like in which a driver operates.

In the thermal efficiency calculation unit 312, thermal efficiency is calculated which changes depending on ignition timing $I_g$, charging efficiency Ec, an air-fuel ratio AF, an EGR ratio $R_{egr}$ and so forth that are operation conditions of the engine.

In the target cylinder air-quantity calculation unit 313, the amount of cylinder air required for the engine to produce the target torque is calculated based on the target torque having been calculated by the target torque calculation unit 311 and the thermal efficiency calculated by the thermal efficiency calculation unit 312.

In the target inlet-manifold pressure calculation unit 321, inlet-manifold pressure required to introduce the amount of target cylinder air into the cylinder is calculated as target inlet-manifold pressure.

In the target throttle upstream pressure calculation unit 322, target throttle upstream pressure required for implementing the target inlet-manifold pressure is calculated by giving consideration to pressure reduction due to pressure losses at the throttle valve.

In the target compressor driving-force calculation unit 323, target compressor driving-force is calculated based on a pressure ratio downstream of the compressor and upstream thereof, and on the amount of intake air thereof.

In the target turbine flow-rate calculation unit 324, a target turbine flow-rate is calculated using the target compressor driving-force calculated by the target compressor driving-force calculation unit 323 and an exhaust gas temperature at a turbine upstream portion calculated by the exhaust-port downstream temperature calculation unit 304.

In the target waste-gate-valve opening-degree calculation unit 325, a target waste-gate-valve flow-rate is calculated from an exhaust gas flow-rate and the target turbine flow-rate, and a target waste-gate-valve opening-degree is calculated using the target waste-gate-valve flow-rate and the exhaust gas temperature at the turbine upstream portion calculated by the exhaust-port downstream temperature calculation unit 304.

A supplementary explanation will be made for thermal efficiency and exhaust gas loss.

In a total amount of heat in which gasoline has, a balance which indicates how the amount of the heat is distributed is a "heat balance."

Among distributions of the heat balance, a quantity which is effectively used for the work as rotational power of the engine is the thermal efficiency, and a quantity which is discarded as heat of exhaust gas is the exhaust gas loss. The amount of heat being lost due to the cooling of the engine is cooling loss. Among others, there exists mechanical loss or the like which is the amount of heat being lost due to internal friction of the engine and auxiliary machine drive thereof.

From exhaust gas loss $\eta_{ex}$, an intake-air temperature $T_{in}$ at an intake port portion, the amount of gasoline heat Q, the amount of fuel supply (gasoline mass flow-rate) $G_{fuel}$, constant-pressure specific heat $C_p$, and an exhaust gas flow-rate $G_{ex}$, an exhaust gas temperature $T_{ex}$ at an exhaust port portion is acquired in accordance with Equation (1) based on an equation of states.

[Equation Figure-1]

$$T_{ex} = T_{in} + \frac{\eta_{ex} \times Q \times G_{fuel}}{C_p \times G_{ex}} \quad (1)$$

Consequently, by accurately estimating the exhaust gas loss $\eta_{ex}$, it becomes possible to achieve the calculation of the exhaust gas temperature $T_{ex}$ with higher accuracy.

Figure 4:
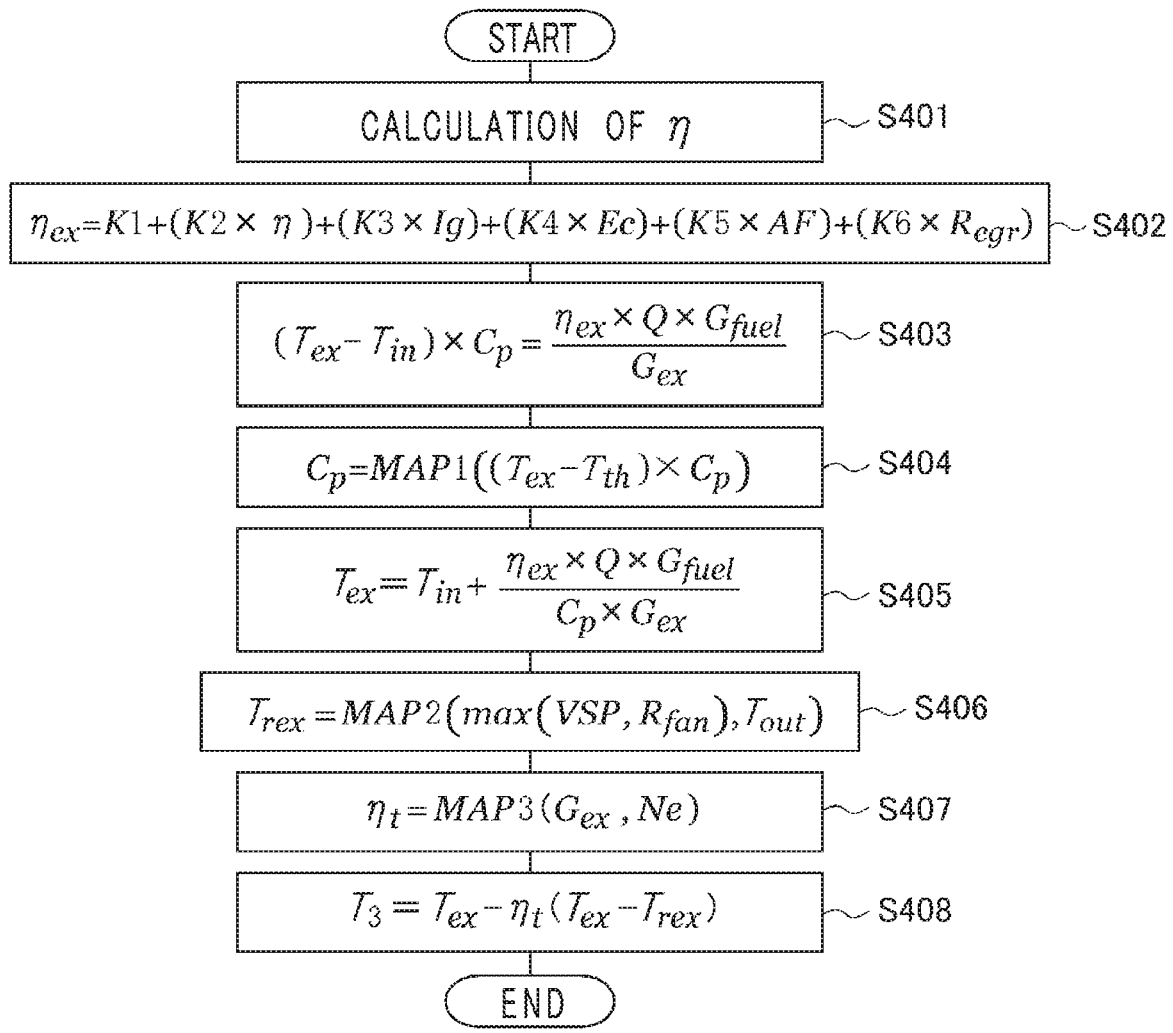
FIG. 4 is a flowchart for explaining the operations of the internal-combustion engine control apparatus according to Embodiment 1 of the present invention.

FIG. 4 is a diagram shown by a flowchart for the thermal efficiency calculation unit 312 of FIG. 3 and the exhaust-gas temperature calculation unit 300 thereof. The explanation will be specifically made as follows.

At Step S401, thermal efficiency $\eta$ is calculated. The thermal efficiency $\eta$ is acquired by storing and correcting changes in thermal efficiency, for example, as mapped values through the usage of at least ignition timing $I_g$, charging efficiency Ec, an air-fuel ratio AF and an EGR ratio $R_{egr}$ being influence factors which act to change the thermal efficiency, with respect to basic constant terms stored in advance in every one of operating states of the engine.

An EGR ratio $R_{egr}$ is a total EGR ratio in which an external EGR ratio acquired from an EGR-valve flow-rate is added to an internal EGR ratio acquired from estimated air intake and exhaust efficiencies.

At Step S402, exhaust gas loss $\eta_{ex}$ is calculated in accordance with Equation (2).

[Equation Figure-2]

$$\eta_{ex} = K1 + (K2 \times \eta) + (K3 \times I_g) + (K4 \times Ec) + (K5 \times AF) + (K6 \times R_{egr}) \quad (2)$$

Symbols K1, K2, K3, K4, K5 and K6 are constants, for which exhaust gas loss acquired from an actually measured exhaust gas temperature when engine parameters are changed in advance on various operation conditions according to an engine model is set in advance as a value determined in accordance with multiple regression analysis from thermal efficiency $\eta$, ignition timing $I_g$, charging efficiency Ec, an air-fuel ratio AF and an EGR ratio $R_{egr}$.

The independent variables used for the calculation of exhaust gas loss $\eta_{ex}$ are not necessarily limited to the thermal efficiency $\eta$, ignition timing $I_g$, charging efficiency Ec, an air-fuel ratio AF and an EGR ratio $R_{egr}$ described above; an independent variable(s), for example, inlet-manifold pressure Pb or the like, may be additionally implemented so that an error between actually measured exhaust gas loss acquired from an exhaust gas temperature and exhaust gas loss $\eta_{ex}$ acquired by an approximate expression becomes smaller. In addition, for example, in a case in which actually measured exhaust gas loss acquired from an exhaust gas temperature indicates the tendency of a two-dimensional curve with respect to ignition timing $I_g$, it may be adopted that the aforementioned independent variable is modified to a square term of the ignition timing $I_g$, or the square term thereof is additionally implemented as an independent variable.

At Step S403, in Equation (1) in which an exhaust gas temperature $T_{ex}$ at an exhaust port portion is acquired from exhaust gas loss $\eta_{ex}$, a value of $\{(T_{ex}-T_{in}) \times C_p\}$ including two of the exhaust gas temperature $T_{ex}$ and the constant-pressure specific heat $C_p$ which are unknown quantities at this point in time is acquired by Equation (3) using the exhaust gas loss $\eta_{ex}$, the amount of gasoline heat Q, the amount of fuel supply $G_{fuel}$ and an exhaust gas flow-rate $G_{ex}$ being known quantities.

[Equation Figure-3]

$$(T_{ex} = T_{in}) + C_p = \frac{\eta_{ex} \times Q \times G_{fuel}}{G_{ex}} \quad (3)$$

The amount of gasoline heat Q is a constant, which is 44000 [kJ/kg].

The amount of fuel supply $G_{fuel}$ is acquired from the amount of cylinder air $G_{air}$ acquired from the amount of intake air (actually measured air flow-rate) $G_r$ measured as the quantity by the air flow sensor 12 by giving consideration to intake delays into the cylinder, and an air-fuel ratio AF.

$$G_{fuel} = G_{air}/AF \quad (4)$$

An exhaust gas flow-rate $G_{ex}$ is acquired from the amount of cylinder air $G_{air}$ and the amount of fuel supply $G_{fuel}$.

$$G_{ex}=G_{air}+G_{fuel} \quad (5)$$

In order to calculate an exhaust gas temperature, an exhaust gas flow-rate $G_{ex}$ and the amount of fuel supply $G_{fuel}$ in an exhaust stroke of the engine are required; however, by giving consideration to stroke delays, the values before three strokes are used in a case of a four-cylinder engine, because the amount of cylinder air $G_{air}$ is a measured value as the quantity in an intake stroke.

At Step S404, constant-pressure specific heat $C_p$ is acquired from "$(T_{ex}-T_{in})\times C_p$" acquired at Step S403 in accordance with Equation (6) which refers to a value of MAP1.

[Equation Figure-4]

$$C_p=\text{MAP1}((T_{ex}-T_{in})\times C_p) \quad (6)$$

The relationship between constant-pressure specific heat $C_p$ and a total value "$(T_{ex}-T_{in})\times C_p$" of an unknown quantity acquired by Equation (3) is acquired by referring to the MAP1 that is set by verifying the relationship between a total value "$(T_{ex}-T_{in})\times C_p$" of an unknown quantity and constant-pressure specific heat $C_p$, in a case in which engine parameters are changed in advance on various operation conditions.

It may be adopted that, by setting a gradient "a" and an intercept "b" as constants in advance, constant-pressure specific heat $C_p$ is acquired by Equation (7) of calculation expression as follows.

$$C_p=\{(T_{ex}-T_{in})\times C_p\}\times a+b \quad (7)$$

Because constant-pressure specific heat $C_p$ changes depending on an exhaust gas temperature, the constant-pressure specific heat $C_p$ cannot be acquired if an exhaust gas temperature $T_{ex}$ has not been acquired; however, constant-pressure specific heat $C_p$ can be acquired in such a manner that, after having acquired a total value "$(T_{ex}-T_{in})\times C_p$" of an unknown quantity, the constant-pressure specific heat $C_p$ is acquired by Equation (6) or Equation (7) using the total value "$(T_{ex}-T_{in})\times C_p$" of an unknown quantity.

At Step S405, an exhaust gas temperature $T_{ex}$ at an exhaust port portion is acquired by Equation (1) as follows.

[Equation Figure-5]

$$T_{ex}=T_{in}+\frac{\eta_{ex}\times Q\times G_{fuel}}{C_p\times G_{ex}} \quad (1)$$

An intake-air temperature $T_{in}$ at an intake port portion is a value detected by the inlet-manifold intake-air temperature sensor 6 attached on the surge tank 5.

Figure 5A:
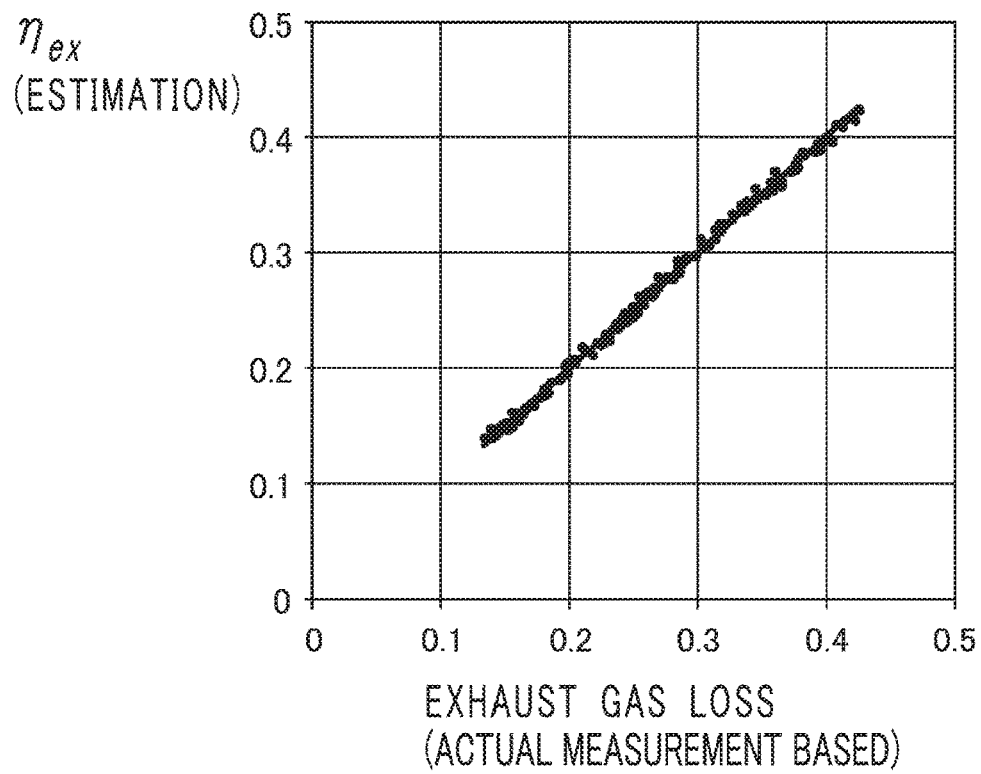
FIG. 5A and FIG. 5B are diagrams each showing graphs indicating estimation accuracy which is the relationship between actual measurement values and estimate values according to Embodiment 1 of the present invention.
Figure 5B:
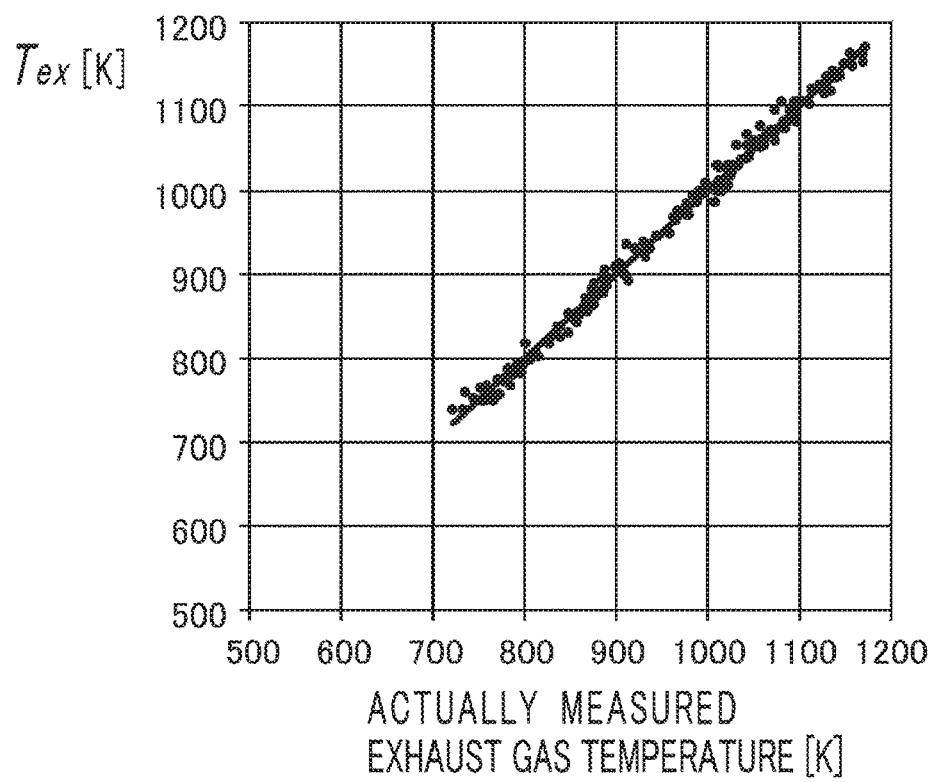

FIG. 5A and FIG. 5B are graphs showing estimation results of exhaust gas loss $\eta_{ex}$ and an exhaust gas temperature $T_{ex}$ at an exhaust port portion, respectively.

FIG. 5A is a graph showing exhaust gas loss $\eta_{ex}$ acquired by Equation (2) with respect to exhaust gas loss calculated from an actually measured exhaust gas temperature at an exhaust port portion; it can be understood that the results are obtained, demonstrating a strong correlation with each other.

FIG. 5B is a graph showing an exhaust gas temperature $T_{ex}$ at an exhaust port portion acquired by Equation (1) with respect to an actually measured exhaust gas temperature at the exhaust port portion; it can be understood that the results are obtained, demonstrating a strong correlation with each other.

At Step S406, an exhaust-pipe surrounding temperature $T_{rex}$ in an engine room is acquired by Equation (8).

Figure 6:
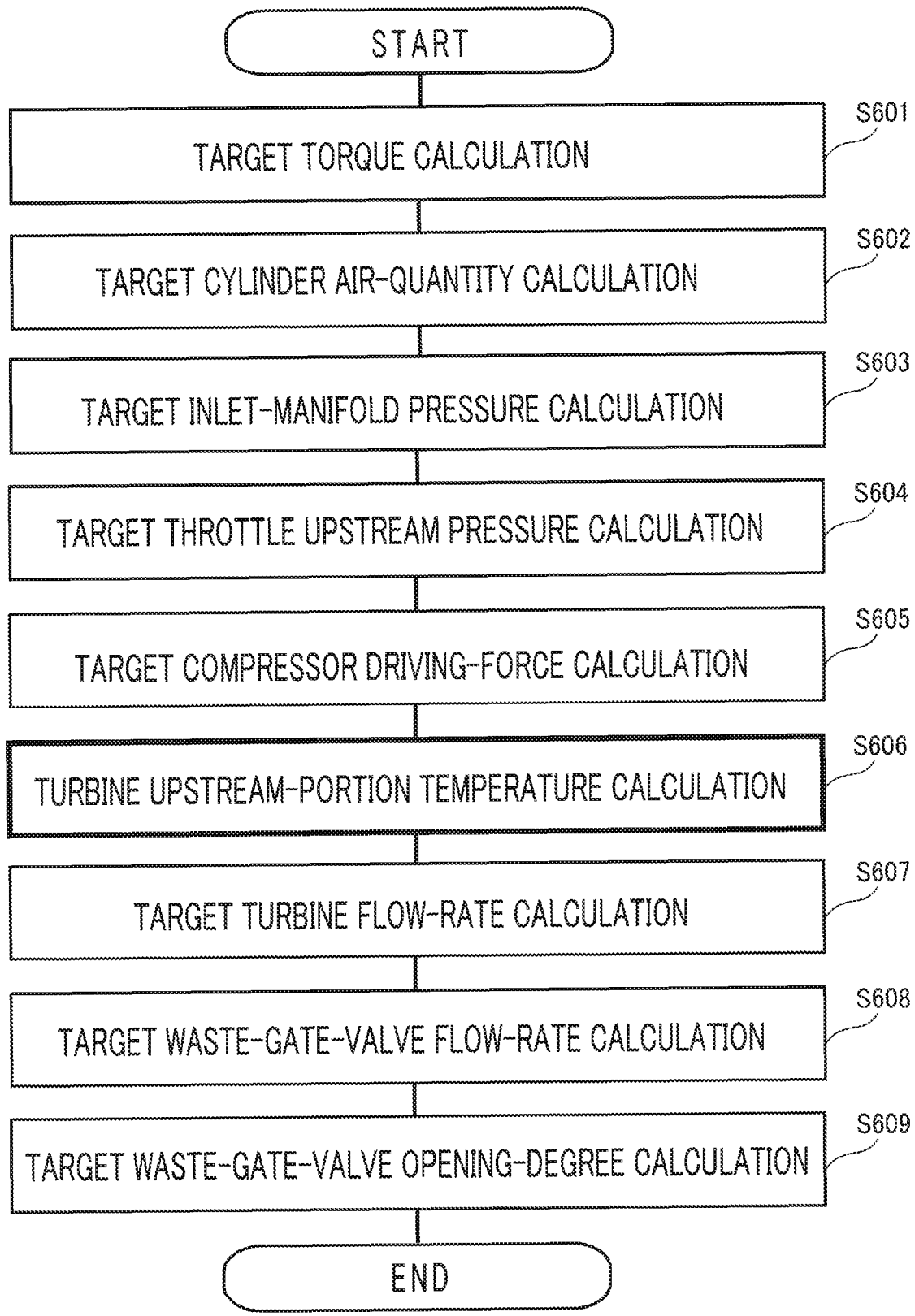
FIG. 6 is a flowchart for explaining the operations of the internal-combustion engine control apparatus according to Embodiment 1 and Embodiment 2 of the present invention.

[Equation Figure-6]

$$T_{rex}=\text{MAP2}(\max(VSP,R_{fan}),T_{out}) \quad (8)$$

From a larger value between a vehicle speed VSP and a wind speed $R_{fan}$ of a radiator fan, and from an external atmospheric air temperature $T_{out}$, an exhaust-pipe surrounding temperature $T_{rex}$ is acquired by referring to a MAP2 being set in advance. The vehicle speed VSP is a detected value by a vehicle speed sensor (not shown in the figures).

A wind speed $R_{fan}$ of the radiator fan is a value stored as a constant which is the wind speed at the time of radiator fan operation; the constant value is selected at the time of radiator fan operation, and "0," at the time of no-operation thereof.

The external atmospheric air temperature $T_{out}$ is a detected value by an external atmospheric air temperature sensor (not shown in the figures).

An exhaust-pipe surrounding temperature $T_{rex}$ in an engine room undergoes the influence by thermal reception from the exhaust pipe, and that by heat radiation and thermal diffusion due to guided external atmospheric air from a radiator front grille at the time of vehicle's running or radiator fan operation, and thus, exhaust-pipe surrounding temperatures in the engine room are measured by using an actual automotive vehicle in advance, which are set in a MAP2 and referred to.

At Step S407, temperature efficiency $\eta_t$ of an exhaust pipe is acquired by Equation (9).

Figure 7:
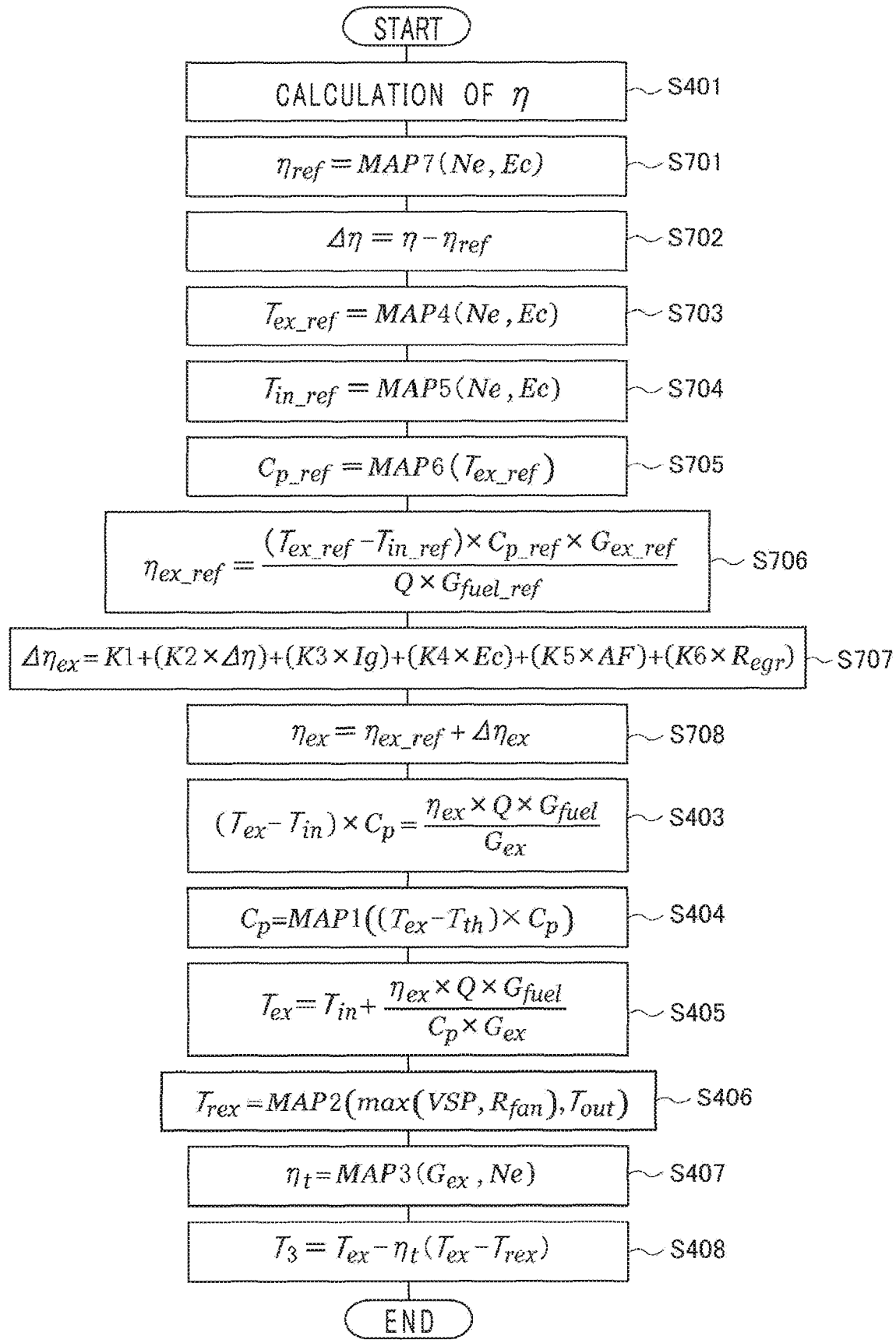
FIG. 7 is another flowchart for explaining the operations of the internal-combustion engine control apparatus according to Embodiment 2 of the present invention.

[Equation Figure-7]

$$\eta_t=\text{MAP3}(G_{ex},Ne) \quad (9)$$

The temperature efficiency $\eta_t$ of the exhaust pipe is defined as a ratio (Equation (10)) between a temperature differential $(T_{ex}-T_3)$ in which an exhaust gas temperature $T_{ex}$ at an exhaust port portion is then reduced to an exhaust gas temperature $T_3$ at an exhaust-port downstream portion, and a temperature differential $(T_{ex}-T_{rex})$ between the exhaust gas temperature $T_{ex}$ at the exhaust port portion and an exhaust-pipe surrounding temperature $T_{rex}$.

[Equation Figure-8]

$$\eta_t=\frac{T_{ex}-T_3}{T_{ex}-T_{rex}} \quad (10)$$

Because the temperature efficiency $\eta_t$ of the exhaust pipe has a correlation with an exhaust gas flow-rate $G_{ex}$ and an engine's rotational speed Ne, it is so arranged that, upon measuring an exhaust gas temperature $T_{ex}$ at the exhaust port portion, an exhaust gas temperature $T_3$ at the exhaust-port downstream portion and an exhaust-pipe surrounding temperature $T_{rex}$ in the engine room by using an actual automotive vehicle in advance, the temperature efficiency of the exhaust pipe is acquired and then set in the MAP3.

At Step S408, an exhaust gas temperature $T_3$ at the exhaust-port downstream portion is acquired by Equation (11).

[Equation Figure-9]

$$T_3 = T_{ex} - \eta_t(T_{ex} - T_{rex}) \quad (11)$$

The term $\eta_t (T_{ex}-T_{rex})$ is a changed temperature in the exhaust pipe from an exhaust port portion toward the exhaust-port downstream portion, and thus the exhaust gas temperature $T_3$ at the exhaust-port downstream portion is acquired by subtracting the changed temperature from an exhaust gas temperature $T_{ex}$ at the exhaust port portion.

Step S401 of FIG. 4 corresponds with each other to the thermal efficiency calculation unit 312 of FIG. 3; Step S402 of FIG. 4, to the exhaust-gas loss calculation unit 301 of FIG. 3; Steps from Step S403 through Step S405 of FIG. 4, to the exhaust port temperature calculation unit 302 of FIG. 3; Steps from Step S406 to Step S407 of FIG. 4, to the exhaust-pipe changed temperature calculation unit 303 of FIG. 3; and Step S408 of FIG. 4, to the exhaust-port downstream temperature calculation unit 304 of FIG. 3.

FIG. 6 is a diagram showing, as in the flowchart, the target torque calculation unit 311 of FIG. 3, the target cylinder air-quantity calculation unit 313 thereof and the waste-gate-valve control unit 320 thereof. The explanation will be specifically made as follows.

At Step S601, target torque TRQt is calculated. First, because torque in which a driven vehicle requests can be detected as an operation quantity of an accelerator, the relationship between an engine's rotational speed Ne and an accelerator opening-degree D is set in a MAP8 in advance, request torque TRQd is acquired by equation (12).

[Equation Figure-10]

$$TRQd = \text{MAP8}(Ne, D) \quad (12)$$

In a case in which a transmission controller outputs limiting torque for the sake of transmission protection and a case in which a torque request value is also outputted from another controller, arbitration control is performed on request torque TRQd, limiting torque and the like, so that the torque after the arbitration becomes target torque TRQt.

At Step S602, the amount of target cylinder air $G_{ct}$ is calculated from the target torque TRQt. A target indicated mean effective pressure $P_{it}$ is first calculated by Equation (13) from the target torque TRQt, a cylinder stroke volume $V_c$ per one cylinder, the number of cylinder(s) z, and a rotational speed per one cycle (in a case of a four-stroke engine, i=2).

[Equation Figure-11]

$$P_{it} = \frac{TRQt}{V_c \times z / (2\pi \times i)} \quad (13)$$

And then, the amount of target cylinder air $G_{ct}$ is calculated by Equation (14) from the target indicated mean effective pressure $P_{it}$, an air-fuel ratio AF, a cylinder stroke volume $V_c$ per one cylinder, thermal efficiency $\eta$ and the amount of gasoline heat Q.

[Equation Figure-12]

$$G_{ct} = \frac{AF \times P_{it} \times V_c}{\eta \times Q} \quad (14)$$

At Step S603, target inlet-manifold pressure $Pb_t$ is calculated.

The target inlet-manifold pressure $Pb_t$ is calculated by Equation (15) from the amount of target cylinder air $G_{ct}$, an air gas-constant $R_a$, an intake-air temperature $T_{in}$ at an intake port portion, a volume efficiency correction coefficient K and a cylinder stroke volume $V_c$ per one cylinder.

[Equation Figure-13]

$$Pb_t + \frac{G_{ct} \times R_a \times T_{in}}{K_v \times V_c} \quad (15)$$

The volume efficiency correction coefficient K is a ratio of an air volume in an inlet manifold being taken into the cylinder with respect to a cylinder stroke volume $V_c$, and is acquired by Equation (16) by setting the relationship between an engine's rotational speed Ne and charging efficiency Ec in a MAP9 in advance.

[Equation Figure-14]

$$K_v = \text{MAP9}(Ne, Ec) \quad (16)$$

At Step S604, target throttle upstream pressure $P_{2t}$ is calculated.

In accordance with Equation (17) in which a ratio of throttle upstream pressure $P_2$ detected by the throttle upstream pressure sensor 35 over inlet-manifold pressure Pb detected by the inlet-manifold pressure sensor 15 is multiplied by the target inlet-manifold pressure $Pb_t$, the target throttle upstream pressure $P_{2t}$ is calculated.

[Equation Figure-15]

$$P_{2t} = Pb_t \times (P_2/Pb) \quad (17)$$

At Step S605, target compressor driving-force $P_{ct}$ is calculated.

By giving consideration to the law of conservation of mass and to polytropic changes, the target compressor driving-force $P_{ct}$ is calculated by Equation (18) from the amount of target cylinder air $G_{ct}$, adiabatic efficiency $\eta_c$ of the compressor, a ratio of specific heat of air, $\kappa_a$, an air gas-constant $R_a$, an intake air temperature $T_1$ detected by the intake air temperature sensor 13, the target throttle upstream pressure $P_{2t}$ and atmospheric air pressure $P_1$ detected by the atmospheric air pressure sensor 9.

[Equation Figure-16]

$$P_{ct} = G_{ct} \times \frac{1}{\eta_c} \times \frac{\kappa_a}{\kappa_a - 1} \times R_a \times T_1 \times \left\{ \left(\frac{P_{2t}}{P_1}\right)^{\frac{\kappa_a-1}{\kappa_a}} - 1 \right\} \quad (18)$$

The adiabatic efficiency $\eta_c$ of the compressor is acquired from a pressure ratio $P_{2t}/P_1$ downstream of the compressor and upstream thereof, and from the amount of target cylinder air $G_{ct}$ by using Equation (19) in which a MAP10 is referred to.

[Equation Figure-17]

$$\eta_c = \text{MAP10}(P_2t/P_1, G_{ct}) \quad (19)$$

The calculation of an exhaust gas temperature $T_3$ at an exhaust-port downstream portion being an exhaust gas temperature at a turbine upstream portion at Step S606 corresponds to the flowchart of FIG. 4 having been explained above, and thus, the explanation is omitted here.

At Step S607, a target turbine flow-rate $G_{tt}$ is calculated.

By giving consideration to the law of conservation of mass and to polytropic changes, the target turbine flow-rate $G_{tt}$ is calculated by Equation (20) from the target compressor driving-force $P_{ct}$, adiabatic efficiency $\eta_t$ of the turbine, a ratio of specific heat of exhaust gas, $\kappa_{ex}$, an exhaust-gas gas-constant $R_{ex}$, an exhaust gas temperature $T_3$ at the exhaust-port downstream portion, turbine downstream pressure $P_4$ and turbine upstream pressure $P_3$.

[Equation Figure-18]

$$G_{tt} = \frac{P_{ct}}{\eta_t \times \frac{\kappa_{ex}}{\kappa_{ex}-1} \times R_{ex} \times T_3 \times \left\{1 - \left(\frac{P_4}{P_3}\right)^{\frac{\kappa_{ex}-1}{\kappa_{ex}}}\right\}} \quad (20)$$

As for the turbine downstream pressure $P_4$, the relationship between turbine downstream pressure $P_4$ and the amount of exhaust flow $Q_{ex}$ having a correlation with a ratio of atmospheric air pressure $P_1$ (the ratio=$P_4/P_1$) is set in a MAP11 in advance, and, after acquiring a ratio $PR_{41}$ between the turbine downstream pressure $P_4$ and the atmospheric air pressure $P_1$ using Equation (21) by referring to the MAP11, turbine downstream pressure $P_4$ is acquired by Equation (22) in which atmospheric air pressure $P_1$ detected by the atmospheric air pressure sensor 9 is multiplied by a ratio $PR_{41}$ between turbine downstream pressure $P_4$ and the atmospheric air pressure $P_1$.

[Equation Figure-19]

$$PR_{41} = \text{MAP11}(Q_{ex}) \quad (21)$$

[Equation Figure-20]

$$P_4 = PR_{41} \times P_1 \quad (22)$$

As for the turbine upstream pressure $P_3$, the relationship between turbine upstream pressure $P_3$ and target compressor driving-force $P_{ct}$ having a correlation with a ratio of turbine downstream pressure $P_4$ (the ratio=$P_3/P_4$) is set in a MAP12 in advance, and, after acquiring a ratio $PR_{34}$ between the turbine upstream pressure $P_3$ and the turbine downstream pressure $P_4$ using Equation (23) by referring to the MAP12, the turbine upstream pressure $P_3$ is acquired by Equation (24) in which turbine downstream pressure $P_4$ acquired by Equation (21) is multiplied by a ratio $PR_{34}$ between the turbine upstream pressure $P_3$ and the turbine downstream pressure $P_4$.

[Equation Figure-21]

$$PR_{34} = \text{MAP12}(P_{ct}) \quad (23)$$

[Equation Figure-22]

$$P_3 = PR_{34} \times P_4 \quad (24)$$

The adiabatic efficiency $\eta_t$ of the turbine is acquired from a pressure ratio $P_4/P_3$ downstream of the turbine and upstream thereof, and from the number of revolutions $N_t$ of the turbine by using Equation (25) in which a MAP13 is referred to.

[Equation Figure-23]

$$\eta_t = \text{MAP13}(P_4/P_3, N_t) \quad (25)$$

As for the number of revolutions $N_t$ of the turbine, because the turbine coaxially rotates with the compressor, the number of revolutions $N_t$ thereof is acquired from a pressure ratio $P_2/P_1$ downstream of the compressor and upstream thereof, and from the amount of target cylinder air $G_{ct}$ by using Equation (26) in which a MAP14 is referred to.

[Equation Figure-24]

$$N_t = \text{MAP14}(P_2/P_1, G_{ct}) \quad (26)$$

At Step S608, a target waste-gate-valve flow-rate $G_{wgt}$ is calculated.

The difference between an exhaust gas flow-rate $G_{ex}$ and the target turbine flow-rate $G_{tt}$ is defined as a target waste-gate-valve flow-rate $G_{wgt}$.

[Equation Figure-25]

$$G_{wgt} = G_{ex} - G_{tt} \quad (27)$$

At Step S609, a target waste-gate-valve opening-degree $R_{wgt}$ is calculated.

First, a target waste-gate-valve flow-rate $G_{wgt}$ is converted into a target waste-gate-valve opening area $S_{wgt}$.

By defining the waste gate valve as a throttle valve and obeying the law of conservation of energy, a relational expression of isentropic flow, a relational expression of velocity of sound, and an equation of states, a target waste-gate-valve opening area $S_{wgt}$ is derived by Equation (28) as follows.

[Equation Figure-26]

$$S_{wgt} = \frac{G_{wgt}}{\frac{P_3}{\sqrt{T_3}} \cdot \sigma_{ex}} \quad (28)$$

$$\therefore \sigma_{ex} = \sqrt{\frac{\kappa_{ex}}{R_{ex}} \cdot \frac{20}{\kappa_{ex}-1}\left[\left(\frac{P_4}{P_3}\right)^{\frac{2}{\kappa_{ex}}} - \left(\frac{P_4}{P_3}\right)^{\frac{\kappa_{ex}+1}{\kappa_{ex}}}\right]}$$

Next, from the target waste-gate-valve opening area $S_{wgt}$, a target waste-gate-valve opening-degree $R_{wgt}$ is acquired.

Using a MAP15 in which the area of opening and the degree of opening are set in advance, a target waste-gate-valve opening-degree $R_{wgt}$ is acquired from a target waste-gate-valve opening area $S_{wgt}$.

[Equation Figure-27]

$$R_{wgt} = \text{MAP15}(S_{wgt}) \quad (29)$$

Based on the target waste-gate-valve opening-degree $R_{wgt}$, the waste gate valve 34 is drive-controlled.

Step S601 of FIG. 6 corresponds with each other to the target torque calculation unit 311 of FIG. 3; Step S602 of FIG. 6, to the target cylinder air-quantity calculation unit 313 of FIG. 3; Step S603 of FIG. 6, to the target inlet-manifold pressure calculation unit 321 of FIG. 3; Step S604 of FIG. 6, to the target throttle upstream pressure calculation unit 322 of FIG. 3; Step S605 of FIG. 6, to the target compressor driving-force calculation unit 323 of FIG. 3;

Step S606 of FIG. 6, to the exhaust-port downstream temperature calculation unit 304 of FIG. 3; Step S607 of FIG. 6, to the target turbine flow-rate calculation unit 324 of FIG. 3; and Steps from Step S608 to Step S609 of FIG. 6, to the target waste-gate-valve opening-degree calculation unit 325 of FIG. 3.

As described above, by acquiring exhaust gas loss in accordance with thermal efficiency and with a combination in any two or more of ignition timing, charging efficiency, an air-fuel ratio and an EGR ratio being factors to influence the change in exhaust gas loss and then by estimating an exhaust gas temperature at an exhaust port portion, a change in exhaust gas loss due to a change in thermal efficiency can be accurately estimated, so that it becomes possible to accurately estimate the exhaust gas temperature at the exhaust port portion.

In addition, by performing multiple regression analysis using factors which influence a change of exhaust gas loss and by acquiring a coefficient(s) of an approximate expression, it becomes possible to shorten the number of setting man-hours while securing estimation accuracy of an exhaust gas temperature at the exhaust port portion.

Moreover, by estimating a changed temperature from the exhaust port portion toward the exhaust-port downstream portion and by estimating an exhaust gas temperature at the exhaust-port downstream portion, a temperature at a turbine's inflow port being the exhaust-port downstream portion can be accurately estimated, so that the control accuracy of turbo charging pressure is enhanced.

Furthermore, because a temperature around the exhaust pipe in the engine room is estimated, and because a change of an exhaust gas temperature from the exhaust port portion toward the exhaust-port downstream portion due to heat transfer between the exhaust gas temperature and the temperature around the exhaust pipe is also estimated, it becomes possible to estimate an exhaust gas temperature at the exhaust-port downstream portion more accurately, even when there exists a change in temperature around the exhaust pipe depending on a vehicle's running state.

In a case of a model without attaching a turbo thereon, estimation accuracy of the catalyst temperature is enhanced, because the exhaust-port downstream portion becomes an entrance portion to a catalyst.

Embodiment 2

FIG. 7 is a diagram shown by a flowchart for another processing method of the exhaust-gas temperature calculation unit 300 of FIG. 3. The explanation will be specifically made as follows. The processing at the same Step number as that in FIG. 4 is the same one. The processing in the air-quantity calculation unit 310 and that in the waste-gate-valve control unit 320 is the same as those of exemplary embodiments in Embodiment 1; thus, their explanation is omitted.

At Step S401, thermal efficiency $\eta$ is calculated. The thermal efficiency $\eta$ is acquired by storing and correcting changes in thermal efficiency, for example, as mapped values through the usage of at least ignition timing $I_g$, charging efficiency Ec, an air-fuel ratio AF and an EGR ratio $R_{egr}$ being influence factors which act to change the thermal efficiency, with respect to basic constant terms stored in advance in every one of operating states of the engine.

An EGR ratio $R_{egr}$ is a total EGR ratio in which an external EGR ratio acquired from an EGR-valve flow-rate is added to an internal EGR ratio acquired from estimated air intake and exhaust efficiencies.

At Step S701, thermal efficiency $\eta_{ref}$ in a reference operating state is calculated.

Thermal efficiency in which the engine is operated in a reference operating state is stored as a value in a MAP7 in advance in every one of an engine's rotational speed Ne and charging efficiency Ec, so that the value is acquired by Equation (30) as the thermal efficiency $\eta_{ref}$ in the reference operating state.

[Equation Figure-28]

$$\eta_{ref} = MAP7(Ne, Ec) \qquad (30)$$

A reference operating state is an operating state which is a state that ignition timing, variable valve timing (VVT) operation angles, an EGR valve opening-degree, an air-fuel ratio and the like are set at their optimum values.

At Step S702, a thermal efficiency deviation 4A is calculated.

The difference between thermal efficiency $\eta$ acquired at Step S401 and thermal efficiency $\eta_{ref}$ in a reference operating state acquired at Step S701 is acquired by Equation (31) as the thermal efficiency deviation $\Delta\eta$.

[Equation Figure-29]

$$\Delta\eta = \eta - \eta_{ref} \qquad (31)$$

At Step S703, an exhaust gas temperature $T_{ex\_ref}$ at an exhaust port portion in a reference operating state is calculated.

A value in which a 'stable' exhaust gas temperature measured in every one of an engine's rotational speed Ne and charging efficiency Ec when the engine is operated in a reference operating state is stored as a value in a MAP4 in advance, so that the value is acquired by Equation (32) as the exhaust gas temperature $T_{ex\_ref}$ at the exhaust port portion in the reference operating state.

[Equation Figure-30]

$$T_{ex\_ref} = MAP4(Ne, Ec) \qquad (32)$$

At Step S704, an intake-air temperature $T_{in\_ref}$ at an intake port portion in a reference operating state is calculated.

An intake-air temperature at an intake port portion detected by the inlet-manifold intake-air temperature sensor 6 measured in every one of an engine's rotational speed Ne and charging efficiency Ec when the engine is operated in a reference operating state is stored as a value in a MAP5 in advance, so that the value is acquired by Equation (33) as the intake-air temperature $T_{in\_ref}$ at the intake port portion in the reference operating state.

[Equation Figure-31]

$$T_{in\_ref} = MAP5(Ne, Ec) \qquad (33)$$

At Step S705, a constant-pressure specific heat value $C_{p\_ref}$ in a reference operating state is calculated.

Constant-pressure specific heat having a relationship with an exhaust gas temperature is set in a MAP6 in advance, and, responding to an exhaust gas temperature $T_{ex\_ref}$ at the exhaust port portion in the reference operating state acquired by Equation (32), a constant-pressure specific heat value $C_{p\_ref}$ in the reference operating state is acquired by Equation (34).

[Equation Figure-32]

$$C_{p\_ref} = MAP6(T_{ex\_ref}) \qquad (34)$$

At Step S706, exhaust gas loss $\eta_{ex\_ref}$ in a reference operating state is calculated.

Using Equation (35) in which Equation (1) is converted into the equation to acquire exhaust gas loss from an exhaust gas temperature, exhaust gas loss $\eta_{ex\_ref}$ in the reference operating state is acquired.

[Equation Figure-33]

$$\eta_{ex\_ref} = \frac{(T_{ex\_ref} - T_{in\_ref}) \times C_{p\_ref} \times G_{ex\_ref}}{Q \times G_{fuel\_ref}} \quad (35)$$

An exhaust gas temperature $T_{ex\_ref}$ at the exhaust port portion in a reference operating state is a value acquired by Equation (32).

An intake-air temperature $T_{in\_ref}$ at an intake port portion in a reference operating state is a value acquired by Equation (33).

A constant-pressure specific heat value $C_{p\_ref}$ in a reference operating state is a value acquired by Equation (34).

The amount of gasoline heat Q is a constant, which is 44000 [kJ/kg].

The amount of fuel supply $G_{fuel\_ref}$ in a reference operating state is acquired from the amount of cylinder air $G_{air}$ acquired from the amount of intake air $G_r$ measured as the quantity by the air flow sensor 12 by giving consideration to intake delays into the cylinder, and an air-fuel ratio $AF_{ref}$ in the reference operating state.

$$G_{fuel\_ref} = G_{air}/AF_{ref} \quad (36)$$

An exhaust gas flow-rate $G_{ex\_ref}$ in a reference operating state is acquired from the amount of cylinder air $G_{air}$, and from the amount of fuel supply $G_{fuel\_ref}$ in the reference operating state.

$$G_{ex\_ref} = G_{air} + G_{fuel\_ref} \quad (37)$$

In order to calculate the exhaust gas loss from an exhaust gas temperature in a reference operating state, an exhaust gas flow-rate $G_{ex\_ref}$ and the amount of fuel supply $G_{fuel\_ref}$ in an exhaust stroke of the engine are required; however, by giving consideration to stroke delays, the values before three strokes are used in a case of a four-cylinder engine, because the amount of cylinder air $G_{air}$ is a measured value as the quantity in an intake stroke.

At Step S707, an exhaust-gas loss deviation $\Delta\eta_{ex}$ is calculated in accordance with Equation (38).

[Equation Figure-34]

$$\Delta\eta_{ex} = K1 + (K2 \times \Delta) + (K3 \times Ig) + (K4 \times Ec) + (K5 \times AF) + (K6 \times R_{egr}) \quad (38)$$

Symbols K1, K2, K3, K4, K5 and K6 are constants, for which a deviation of exhaust gas loss in a reference operating state with respect to exhaust gas loss acquired from an actually measured exhaust gas temperature when engine parameters are changed in advance on various operation conditions according to an engine model is set in advance as a value determined in accordance with multiple regression analysis from a thermal efficiency deviation $\Delta\eta$ with respect to thermal efficiency in the reference operating state, ignition timing $I_g$, charging efficiency Ec, an air-fuel ratio AF and an EGR ratio $R_{egr}$.

The independent variables used for the calculation of an exhaust-gas loss deviation $\Delta\eta_{ex}$ are not necessarily limited to a thermal efficiency deviation $\Delta\eta$ with respect to thermal efficiency in a reference operating state, ignition timing $I_g$, charging efficiency Ec, an air-fuel ratio AF and an EGR ratio $R_{egr}$ described above; an independent variable(s), for example, inlet-manifold pressure Pb or the like, may be additionally implemented so that an error between exhaust gas loss acquired from an actually measured exhaust gas temperature and exhaust gas loss $\eta_{ex}$ acquired by an approximate expression becomes smaller. In addition, for example, in a case in which actually measured exhaust gas loss acquired from an exhaust gas temperature indicates the tendency of a two-dimensional curve with respect to ignition timing $I_g$, it may be adopted that the aforementioned independent variable is modified to a square term of the ignition timing $I_g$, or the square term thereof is additionally implemented as an independent variable.

At Step S708, exhaust gas loss $\eta_{ex}$ is calculated.

Using Equation (39) which adds an exhaust-gas loss deviation $\Delta\eta_{ex}$ acquired by Equation (38) to exhaust gas loss $\eta_{ex\_ref}$ in the in a reference operating state acquired by Equation (35), the exhaust gas loss $\eta_{ex}$ is acquired.

[Equation Figure-35]

$$\eta_{ex} = \eta_{ex\_ref} + \Delta\eta_{ex} \quad (39)$$

At Steps from Step S403 through Step S408 of FIG. 7, the same processing is performed as that at Steps from Step S403 through Step S408 of FIG. 4, so that an exhaust gas temperature $T_3$ at the exhaust-port downstream portion is acquired.

Steps from Step S401 to Step S701 and to Step S702 of FIG. 7 correspond with each other to the thermal efficiency calculation unit 312 of FIG. 3; Steps from Step S703 through Step S708 of FIG. 7, to the exhaust-gas loss calculation unit 301 of FIG. 3; Steps from Step S403 through Step S405 of FIG. 7, to the exhaust port temperature calculation unit 302 of FIG. 3; Steps from Step S406 to Step S407 of FIG. 7, to the exhaust-pipe changed temperature calculation unit 303 of FIG. 3; and Step S408 of FIG. 7, to the exhaust-port downstream temperature calculation unit 304 of FIG. 3.

According to Embodiment 2 described above, by acquiring a change in exhaust gas loss from that in a reference operating state in accordance with a change in thermal efficiency from that in the reference operating state and in accordance with a combination in any two or more of ignition timing, charging efficiency, air-fuel ratio and an EGR ratio being factors to influence the change in exhaust gas loss, and then by estimating an exhaust gas temperature at the exhaust port portion, it is made possible to estimate an exhaust gas temperature with reference to an actually measured exhaust gas temperature, so that an absolute value error is accurately modified, and it becomes possible to more accurately estimate the exhaust gas temperature.

In the present invention, each of the embodiments can be freely combined, and/or each of the embodiments can be appropriately modified or eliminated without departing from the scope of the invention.

What is claimed is:

1. An internal-combustion engine control apparatus, comprising:
   a thermal efficiency calculator for calculating thermal efficiency based on a combination in any of ignition timing, charging efficiency, an air-fuel ratio and an exhaust gas recirculation ratio being change factors in thermal efficiency of an internal-combustion engine;
   an exhaust-gas loss calculator for calculating exhaust gas loss based on the thermal efficiency calculated by the thermal efficiency calculator, and on a combination in any of ignition timing, charging efficiency, an air-fuel ratio and an exhaust gas recirculation ratio being change factors of the exhaust gas loss;

an exhaust port temperature calculator for calculating an exhaust gas temperature at an exhaust port portion based on the exhaust gas loss calculated by the exhaust-gas loss calculator;

a target waste-gate-valve opening-degree calculator for calculating a target opening degree of a waste gate valve of a turbocharger based on the exhaust gas temperature calculated by the exhaust port temperature calculator; and a controller configured to control an opening degree of the waste gate valve based on the target opening degree calculated by the target waste-gate-valve opening-degree calculator.

2. An internal-combustion engine control apparatus, comprising:

a thermal efficiency calculator for calculating a deviated quantity in thermal efficiency being a deviated quantity in thermal efficiency with respect to thermal efficiency in a previous reference operating state based on thermal efficiency stored in advance in a reference operating state, and on a combination in any of ignition timing, charging efficiency, an air-fuel ratio and an exhaust gas recirculation ratio being change factors in thermal efficiency of an internal-combustion engine;

an exhaust-gas loss calculator for calculating exhaust gas loss in a reference operating state from an exhaust gas temperature stored in advance in a reference operating state, for calculating a deviated quantity in exhaust gas loss from that in a previous reference operating state based on the deviated quantity in thermal efficiency calculated by the thermal efficiency calculator and on a combination in any of ignition timing, charging efficiency, an air-fuel ratio and an exhaust gas recirculation ratio being change factors of the exhaust gas loss, and for calculating exhaust gas loss from a deviated quantity between exhaust gas loss in the reference operating state and exhaust gas loss from that in the previous reference operating state;

an exhaust port temperature calculator for calculating an exhaust gas temperature at an exhaust port portion based on the exhaust gas loss calculated by the exhaust-gas loss calculator;

a target waste-gate-valve opening-degree calculator for calculating a target opening degree of a waste gate valve of a turbocharger based on the exhaust gas temperature calculated by the exhaust port temperature calculator; and a controller configured to control an opening degree of the waste gate valve based on the target opening degree calculated by the target waste-gate-valve opening-degree calculator.

3. The internal-combustion engine control apparatus as set forth in claim 1, wherein exhaust gas loss being calculated by the exhaust-gas loss calculator is calculated in accordance with a computational expression derived from multiple regression analysis, based on a combination in any of the change factors of exhaust gas loss.

4. The internal-combustion engine control apparatus as set forth in claim 2, wherein a deviated quantity in exhaust gas loss from that in a previous reference operating state, being calculated by the exhaust-gas loss calculator, is calculated in accordance with a computational expression derived from multiple regression analysis, based on a combination in any of the change factors of exhaust gas loss.

5. The internal-combustion engine control apparatus as set forth in claim 1, further comprising:

an exhaust-pipe changed temperature calculator for calculating a changed exhaust-gas temperature in an exhaust pipe, reaching from an exhaust port portion to an exhaust-port downstream portion, therebetween; and an exhaust-port downstream temperature calculator for calculating an exhaust gas temperature at the exhaust-port downstream portion by incorporating the changed exhaust-gas temperature into an exhaust gas temperature at the exhaust port portion.

6. The internal-combustion engine control apparatus as set forth in claim 2, further comprising:

an exhaust-pipe changed temperature calculator for calculating a changed exhaust-gas temperature in an exhaust pipe, reaching from an exhaust port portion to an exhaust-port downstream portion, therebetween; and an exhaust-port downstream temperature calculator for calculating an exhaust gas temperature at the exhaust-port downstream portion by incorporating the changed exhaust-gas temperature into an exhaust gas temperature at the exhaust port portion.

7. The internal-combustion engine control apparatus as set forth in claim 5, wherein the exhaust-pipe changed temperature calculator estimates an exhaust-pipe surrounding temperature in an engine room based on a vehicle speed, and on a presence-and-absence of radiator fan operation and on an external atmospheric air temperature, and calculates the changed exhaust-gas temperature based on heat transfer from the exhaust pipe, around the exhaust pipe, toward surroundings thereof.

8. The internal-combustion engine control apparatus as set forth in claim 6, wherein the exhaust-pipe changed temperature calculator estimates an exhaust-pipe surrounding temperature in an engine room based on a vehicle speed, and on a presence-and-absence of radiator fan operation and on an external atmospheric air temperature, and calculates the changed exhaust-gas temperature based on heat transfer from the exhaust pipe, around the exhaust pipe, toward surroundings thereof.

9. The internal-combustion engine control apparatus as set forth in claim 1, wherein the air-fuel ratio is measured by an air-fuel ratio sensor located downstream from the waste-gate valve.

10. The internal-combustion engine control apparatus as set forth in claim 2, wherein the air-fuel ratio is measured by an air-fuel ratio sensor located downstream from the waste-gate valve.

* * * * *